Patented Dec. 22, 1931

1,837,614

UNITED STATES PATENT OFFICE

ANTON GRAMBERG, OF FRANKFORT-ON-THE-MAIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ACID-PROOF CEMENTING COMPOSITIONS AND PROCESS OF PREPARING THE SAME

No Drawing. Application filed November 28, 1927, Serial No. 236,383, and in Germany December 1, 1926.

The present invention relates to acid-proof cementing compositions and process of preparing the same.

Hitherto iron vessels have been provided with acid-proof linings preferably by covering the inside of the vessels with acid-proof stones, small porcelain slabs or similar material, the adhesion of the stones, etc., to the walls of the vessels and the tightness of the joints being procured by using a cement prepared by means of water-glass. However the water-glass cements hitherto used were unsatisfactory because the thermal conductivity of the cementing compositions and that of the metal of which the vessel is made differ very much. Owing to the insufficient thermal conductivity of the cement any variations of temperature, as they naturally occur, for instance when the vessels are heated, will cause the metal and the cement to expand in a different degree so that the hardened cementing mass becomes fissured, particularly at the joints of the vessel whereby the lining is very quickly destroyed.

I have now found that it is possible to impart to the acid-proof cementing- and other lining-masses a thermal conductivity nearer to that of the metal vessel, by using as solid constituents of the cementing compositions, for instance, cement powder and pulverized alloys of silicon, the structure of which contains primary crystals either of pure silicon or of a solid solution of a metal in silicon. It has proved to be advantageous to use chiefly silicon alloys containing as alloy-component a metal which in combination with the other constituents of the cementing mass, such as for instance water-glass, alkali, silico-fluoride, or the like yield insoluble products, for example alloys composed of: magnesium and silicon, aluminium and silicon, calcium and silicon or iron and silicon.

A mixture of water-glass and pulverized silicon-alloy hardens much quicker than any other of the usual cement compositions, even when no heat is applied, and this mixture has proved to be absolutely acid-proof against any acid, except hydro fluoric acid.

In order to obtain a well hardening composition, the addition of about 2 to 3 per cent of the silicon alloy is quite sufficient; the degree of the thermal conductivity of the compositions depends on their content of the alloy.

The following examples serve to illustrate my invention, but they are not intended to limit it thereto, the parts being parts by weight:

1. A cement-powder, consisting of 100 grams of a silicon alloy composed of 90 per cent of silicon and 10 per cent of iron, 850 grams of quartz-powder and 50 grams of sodium silico-fluoride, is intimately mixed with 400 grams of water-glass. Thus, a self-hardening composition is obtained.

2. A cement-powder, consisting of 30 grams of an iron-silicon-alloy containing 90 per cent of silicon, 30 grams of sodium silico-fluoride and 940 grams of quartz powder, is intimately mixed with 400 grams of water-glass. Thus, a self-hardening composition is obtained.

Instead of an iron-silicon alloy containing 90 per cent, there may also be used one of a lower content, such as for instance one containing 70 per cent of silicon.

3. A cement-powder, consisting of 800 grams of an iron-silicon-alloy containing 85 per cent of silicon, 150 grams of clay-powder and 50 grams of sodium silico-fluoride, is intimately mixed with 400 grams of water-glass. Thus, a self-hardening composition of excellent thermal conductivity is obtained.

4. A cement-powder, consisting of 1000 grams of a silicon-alloy containing 90 per cent of silicon, is intimately mixed with 400 grams of water-glass. Thus, a self-hardening composition of excellent thermal conductivity is obtained.

5. A cement-powder, consisting of 1000 grams of an alloy of silicon and aluminium containing 90 per cent of silicon, is intimately mixed with 400 grams of water-glass. Thus, a self-hardening composition of high thermal conductivity is obtained.

I claim:

1. The process which consists in intimately mixing with 400 parts of water-glass a cement-powder consisting of 150 parts of clay powder and 50 parts of sodium silico-fluoride and 800 parts of a silicon-alloy composed of 85 per cent of silicon and 15 per cent of iron.

2. An acid-proof cementing composition, obtainable by intimately mixing with 400 parts of water-glass a cement-powder consisting of 800 parts of a silicon-alloy composed of 85 per cent of silicon and 15 per cent of iron, 150 parts of clay-powder and 50 parts of sodium silico-fluoride, said composition being characterized by its excellent thermal conductivity and hardening power.

In testimony whereof, I affix my signature.

ANTON GRAMBERG.